United States Patent [19]
Campbell

[11] 3,967,946
[45] July 6, 1976

[54] MOLD HOLDER ARMS FOR GLASSWARE FORMING MACHINE AND METHOD OF OPERATING THE SAME

[75] Inventor: Lyman Lavelle Campbell, East Longmeadow, Mass.

[73] Assignee: Emhart Corporation, Farmington, Conn.

[22] Filed: Jan. 20, 1975

[21] Appl. No.: 542,089

Related U.S. Application Data

[63] Continuation-in-part of Ser. No. 315,619, Dec. 15, 1972, abandoned.

[52] U.S. Cl. ............................ 65/68; 65/260; 294/87 R; 294/88; 65/359
[51] Int. Cl.² ................................ C03B 9/44
[58] Field of Search ............... 65/260, 68, 359, 360, 65/361; 294/87 R, 63 A, 88; 92/44

[56] References Cited
UNITED STATES PATENTS

| | | | |
|---|---|---|---|
| 1,745,959 | 2/1930 | Steiner | 92/44 |
| 2,949,701 | 8/1960 | Olson et al. | 65/361 X |
| 3,607,207 | 9/1971 | Dahms et al. | 65/360 X |
| 3,617,233 | 11/1971 | Mumford | 65/360 X |

*Primary Examiner*—Robert L. Lindsay, Jr.
*Attorney, Agent, or Firm*—McCormick, Paulding, & Huber

[57] ABSTRACT

A pair of horizontal arms, pivotally supported on a common vertical axis at one end, is provided to hold the separable halves of a plurality of parison molds or a plurality of final shaping (blow) molds in a multi-gob glassware forming machine. The mold halves on each arm (which cooperate with the complementary halves on the other arm to define the mold cavities) are supported for limited movement relative to the arm, and at least one, or if preferred, each arm has a plurality of fluid pressure responsive means (such as a bellows or piston) which apply force to the associated mold halves when they engage the complementary mold halves. Each such arm has a passage connecting its plurality of pressure responsive means, the passage being filled or substantially filled with hydraulic fluid which is subjected to pressure when the arms of the pair are mechanically actuated to bring the complementary mold halves into engagement, so that all of the pressure responsive means in each such arm will apply equal pressure or force to their associated mold halves. In preferred form, each arm has horizontal upper and lower parts or sections connected by an integral vertical strut, and each horizontal section carries a plurality of pressure responsive means. With this arrangement, each mold half is engaged in its upper area and in its lower area by a pressure responsive means applying the same pressure to hold the mold half in closed cavity-forming engagement with its complementary mold half.

8 Claims, 6 Drawing Figures

MOLD HOLDER ARMS FOR GLASSWARE FORMING MACHINE AND METHOD OF OPERATING THE SAME

CROSS REFERENCE TO RELATED APPLICATION

This application is a continuation-in-part of application Ser. No. 315,619, Filed Dec. 15, 1972 now abandoned.

BACKGROUND OF THE INVENTION

In the well known Hartford I.S. type glassware forming machine the mold holder arms at the parison forming station and also at the final shaping or forming station are pivotally supported on a common vertical axis for closing movement toward each other and for opening movement away from each other in a horizontal plane. Each such arm supports at least one mold half or section for engagement with a complementary half or section on the other arm when the arms are closed, the complementary mold halves cooperating to define the mold cavity. These mold halves can be of rather substantial vertical extent or length and it is desirable to have equal force holding the mold halves closed at the top and bottom thereof.

In multi-gob glassware forming machines wherein two or more molds are utilized simultaneously at the parison forming station and final forming station, each mold holder arm supports two or more mold halves cooperating with complementary halves on the other arm. Here again, it is desirable to have equal forces holding the halves of each mold in closed engagement, and it is also desirable but very difficult to have all of the molds held closed with equal forces in the interest of producing uniform ware from all of the molds.

It is the general object of the present invention to provide a mold holder arm construction for multi-gob glassware forming machines wherein the separable halves of each mold are held closed with the same force applied to the separable halves of all of the other molds.

SUMMARY OF THE INVENTION

In accordance with the present invention, a pair of horizontal arms are pivotally supported at one end on a common vertical axis, the said arms being constructed and arranged so that each will support a plurality of glassware mold halves in spaced apart relationship along its length for engagement with complementary mold halves on the other arm. A mechanical linkage mechanism is utilized for operating said arms in forceful closing and opening movements toward and away from each other thus to engage and to disengage the complementary mold halves on the respective arms. The construction and arrangement of each arm is such as to permit movement of each of its associated mold halves relative to the arm when the mold halves are forcefully engaged by the mechanism causing the forceful closing movement of the arms. At least one, and if desired, each such arm has at least one fluid pressure responsive means, such as a piston or bellows, which is movably supported by the arm to engage an associated mold half. Further, each such arm has a closed passage connecting all of its said pressure responsive means, the passage being substantially filled with fluid which is subjected to pressure by the movement of the mold halves relative to the supporting arm and whereby all such pressure responsive means will apply the same pressure to their associated mold half in retaining the mold halves in engagement with each other.

DETAILED DESCRIPTION OF THE PREFERRED EMBODIMENTS

Figure 1:
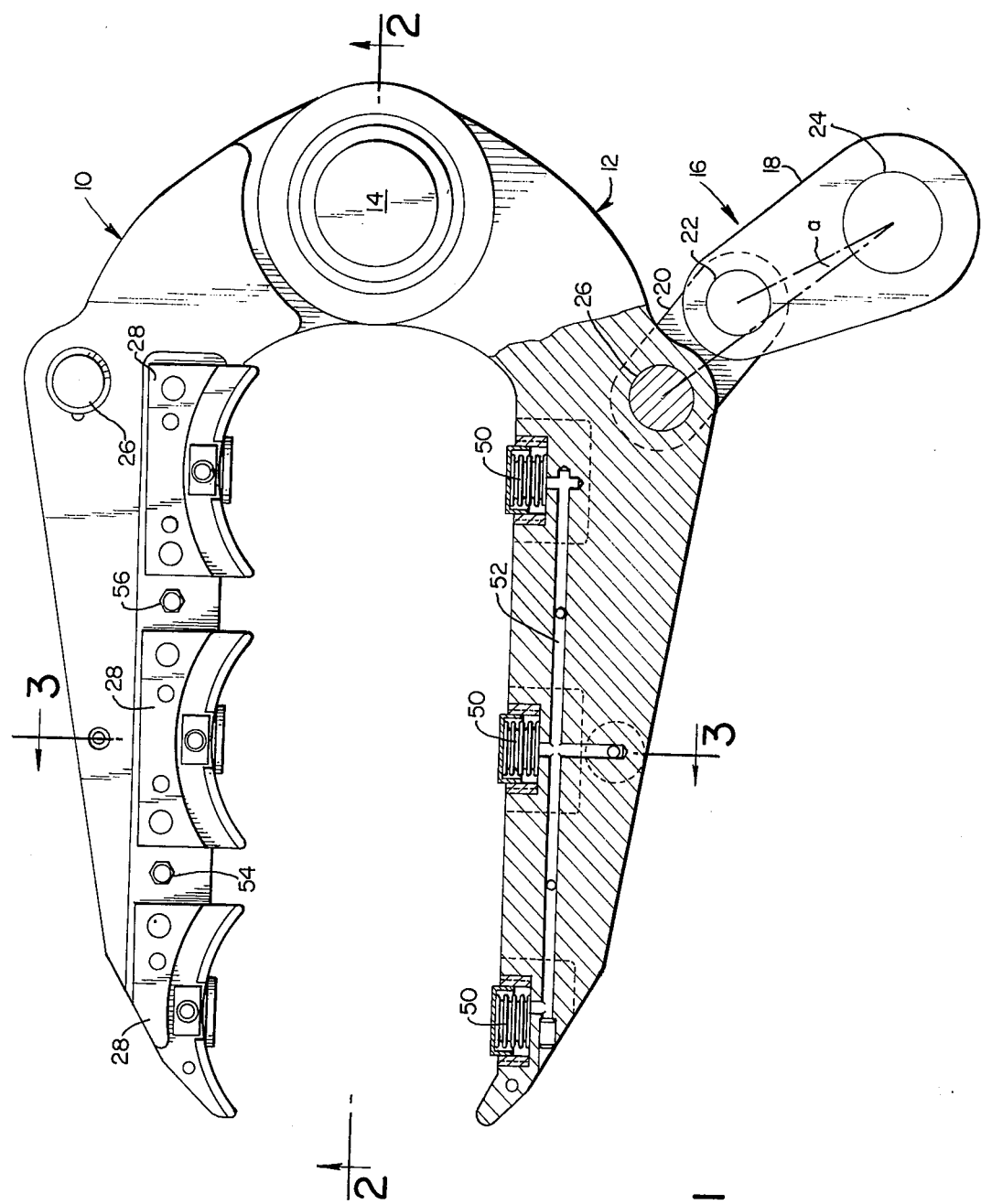
FIG. 1 is a top plan view of a pair of mold holder arms each of which has the aforementioned pressure responsive means provided in accordance with the present invention, with a portion of one arm shown in horizontal section to reveal details of construction.

As shown in FIG. 1 and in keeping with conventional construction in I.S. type glassware forming machines, there are two cooperating mold holder arms 10 and 12 pivotally supported on a common vertical pin or post 14 for closing movement toward each other and for opening movement away from each other in a horizontal plane and on the axis of the pin 14. In further accord with conventional construction, each such arm is so moved or operated by a mechanical linkage mechanism such as indicated generally by the reference number 16 and associated with the arm 12. The linkage mechanism 16 includes toggle links 18 and 20 which are pivotally connected together at one end on a pin 22, the other end of the link 18 being supported on a pin 24 mounted on the machine frame, and the other end of the link 20 being pivotally connected to a pin 26 carried by the associated arm 12 or 10. Obviously, when the linkage mechanism 16 associated with one of the arms is operated so that the angle ($a$) between the lines connecting the centers of the pins 22 and 26 with the center of the pin 24 is reduced, the said associated arm will be moved toward closed position, and as that angle is increased, the arm is moved toward open position. Any conventional means, (not shown) can be used to operate each linkage 16 to effect the simultaneous opening and closing movements of the arms 10 and 12.

In the preferred form, each arm 10 has an upper horizontal section 10a and a lower horizontal section 10b which are connected together by an integrally formed vertical strut 10c, and in like fashion, each arm 12 comprises upper and lower sections 12a and 12b connected by the strut 12c. Further, each arm 10 and 12 is constructed and arranged to support a plurality of mold halves in spaced apart relationship along its length. In the example shown, the arms are adapted for use in a triple gob glassware forming machine so that each arm will support three mold halves for cooperation with complementary mold halves supported on the other arm.

More specifically, the upper section or part of each arm is provided with three spaced apart mold hanger brackets 28, 28 and the lower section or part of each arm is provided with three spaced apart mold brackets 30, 30, the brackets 30 being located below the brackets 28 so that each bracket 28 and a cooperating bracket 30 will support a mold half such as the mold halves 32 and 34 shown in FIGS. 3 and 4. The said mold halves 32 and 34 which are illustrated constitute the complementary halves of a final shaping mold and it will be understood that there are three similar mold halves 32, 32 supported along the arm 12 and there are three complementary mold halves 34, 34 supported along the arm 10.

It is important to note that each mold half 32 is supported for limited relative movement with respect to its associated mold arm 12 and each mold half 34 is supported for limited relative movement with respect to its mold arm 10. More specifically, each such mold half is provided with a depending skirt portion 36 received in the upper bracket 28 on its associated arm so that the said mold half can move relative to the associated arm and bracket as limited by a wall 38 on the mold half engaging one side of a rim 40 on the bracket 28 or by a wall 42 on the mold half engaging the other side of the rim 40. Further, a flanged head screw 44 is threaded into each mold half so that the lower portion of the mold half can float relative to the bracket 30 until the head 46 on said screw engages the opposite sides of a notch 48 provided in the lower bracket 30. Therefore, each of the complementary mold halves 32 and 34 is carried by an arm 12 or 10 so that it can float or move relative to the associated arm by a limited amount.

Figure 4:
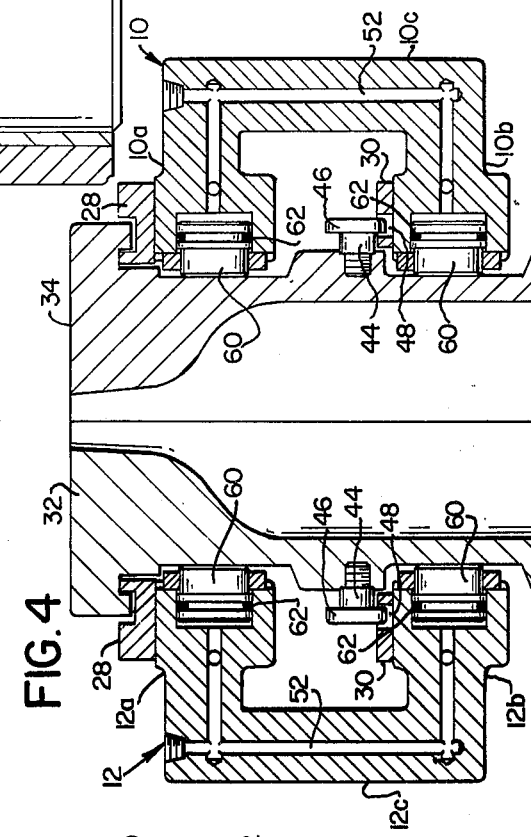
FIG. 4 is a view similar to FIG. 3 but showing the use of a piston as the fluid pressure responsive means rather than the bellows illustrated in FIG. 3.
Figure 3:
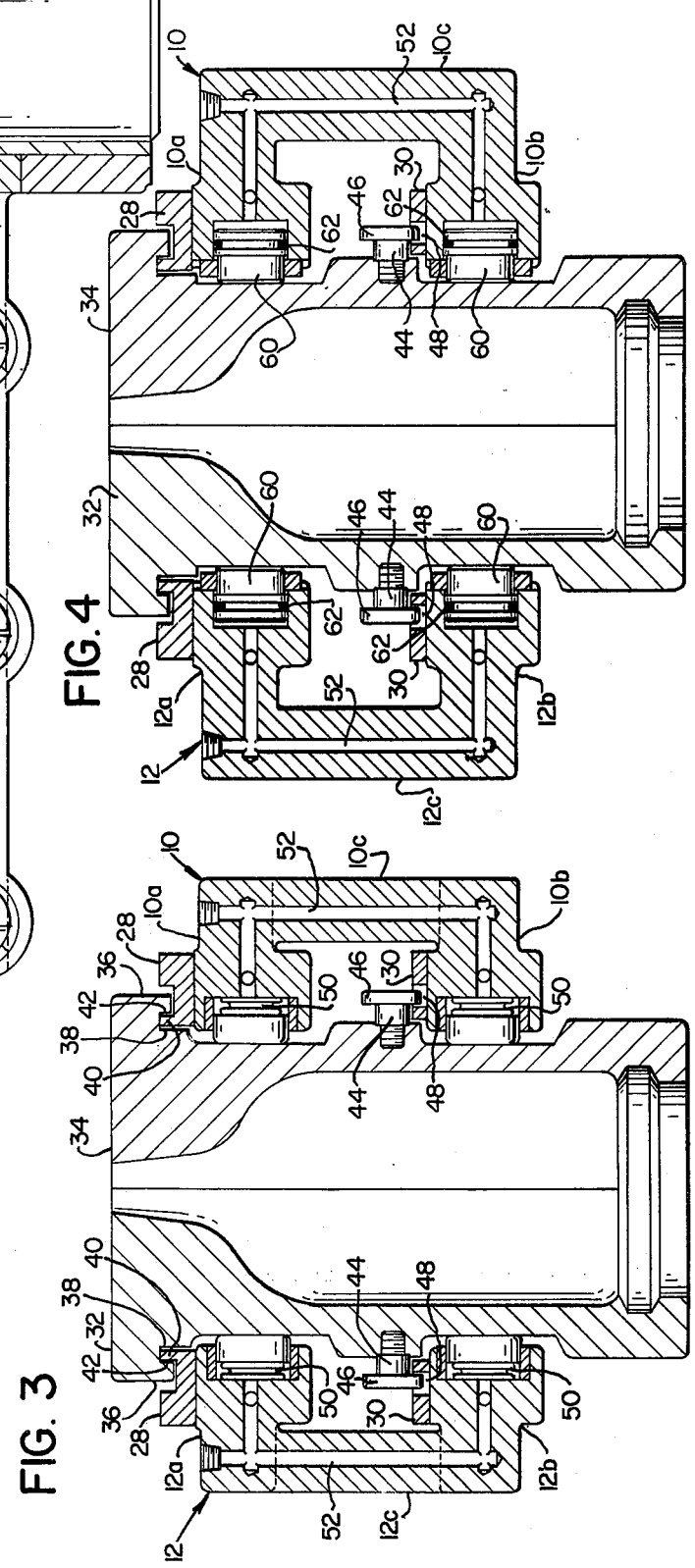
FIG. 3 is a vertical sectional view taken as indicated by the line 3—3 of FIG. 1 and wherein the halves of a mold are also shown.

The complementary mold halves are carried in this floating suspension into engagement with each other as shown in FIGS. 3 and 4. This, of course, is a forceful engagement brought about by the mechanical actuation of the mold arm operating mechanism 16 associated with each arm.

In accordance with the present invention as illustrated in FIGS. 1–4, each arm is especially adapted to equalize the forces applied to its associated mold halves in engagement with the corresponding mold halves. That is, each such arm is provided with a fluid pressure responsive means for applying equal fluid pressure to all of its associated mold halves, such fluid pressure responsive means being adapted to directly engage the associated mold half and apply force to it while it floats relative to the arm after the mechanically actuated closing movement of the arms 10 and 12.

Figure 2:
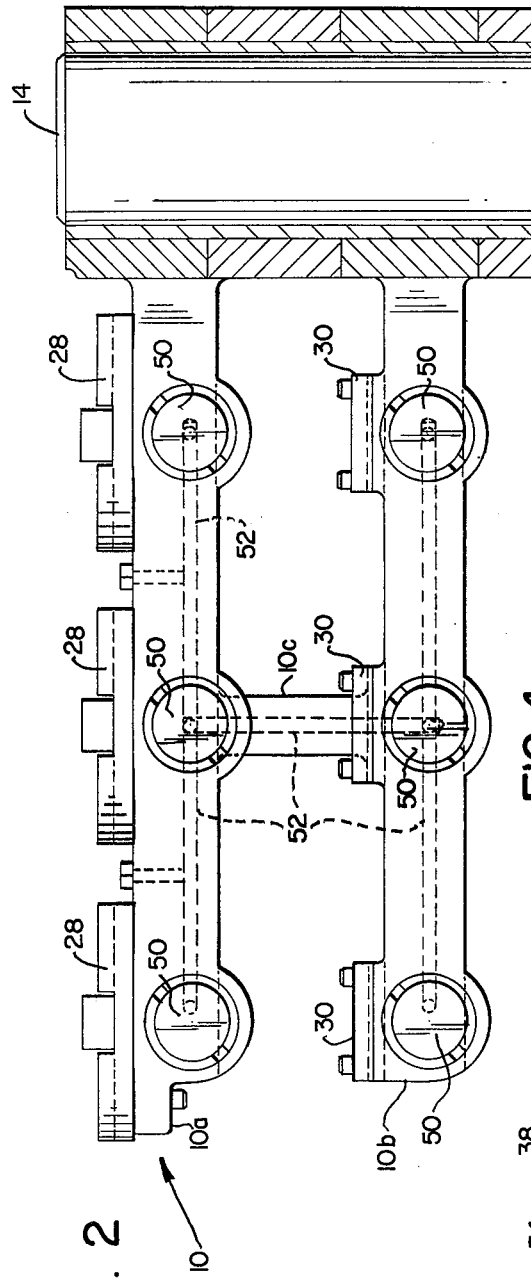
FIG. 2 is a vertical cross sectional view taken as indicated by the line 2—2 of FIG. 1.

In FIGS. 1, 2 and 3 the fluid pressure responsive means in all instances is shown to comprise a bellows 50. Each such bellows 50 is movably supported in an arm 10 or an arm 12 to project inwardly of said arm and to engage an associated mold half 32 or 34 as shown in FIG. 3. All of the bellows or other fluid pressure responsive means are connected by a closed passage 52 and it will be noted that there is one such bellows located in the upper arm portion and in the lower arm portion for each mold half. Thus, the passage includes a section extending through the strut 10c or 12c of each such arm and each such passage includes a horizontally extending portion in each arm section.

The passage 52 is provided with an inlet fitting 54 (FIG. 1) and an outlet fitting 56 so that hydraulic fluid can be introduced to the passage under pressure. That is, when the arms 10 and 12 are forcefully mechanically closed to engage the complementary mold halves 32 and 34, hydraulic fluid under pressure can be introduced through the inlet fitting 54 at sufficient pressure to back the arms 10 and 12 off and to leave the mold halves 32 and 34 freely suspended by such arms but nonetheless forceably engaged with each other due to the hydraulic pressure at the bellows. When the floating condition has been achieved, no additional hydraulic pressure is needed and the inlet fitting 54 can be closed so that the hydraulic fluid will remain in the passage 52. Then, when the arms are opened, the passage 52 will remain charged and substantially filled with hydraulic fluid.

Obviously, with the plurality of fluid pressure responsive means or bellows 50 all connected by the common passage 52, when they engage and forcefully close the mold halves, each such bellows or other fluid pressure responsive means will exert the same pressure in retaining the mold halves in closed condition.

The embodiment shown in FIG. 4 is essentially the same as that shown in FIGS. 1–3 except that a piston 60 is substituted for the bellows 50 as the fluid pressure responsive means. When the piston is utilized, it is arranged to be movable in a chamber 62 within the associated mold holder arm, and such chamber 62 is connected with all other similar chambers by the common passage 52.

Figure 5:
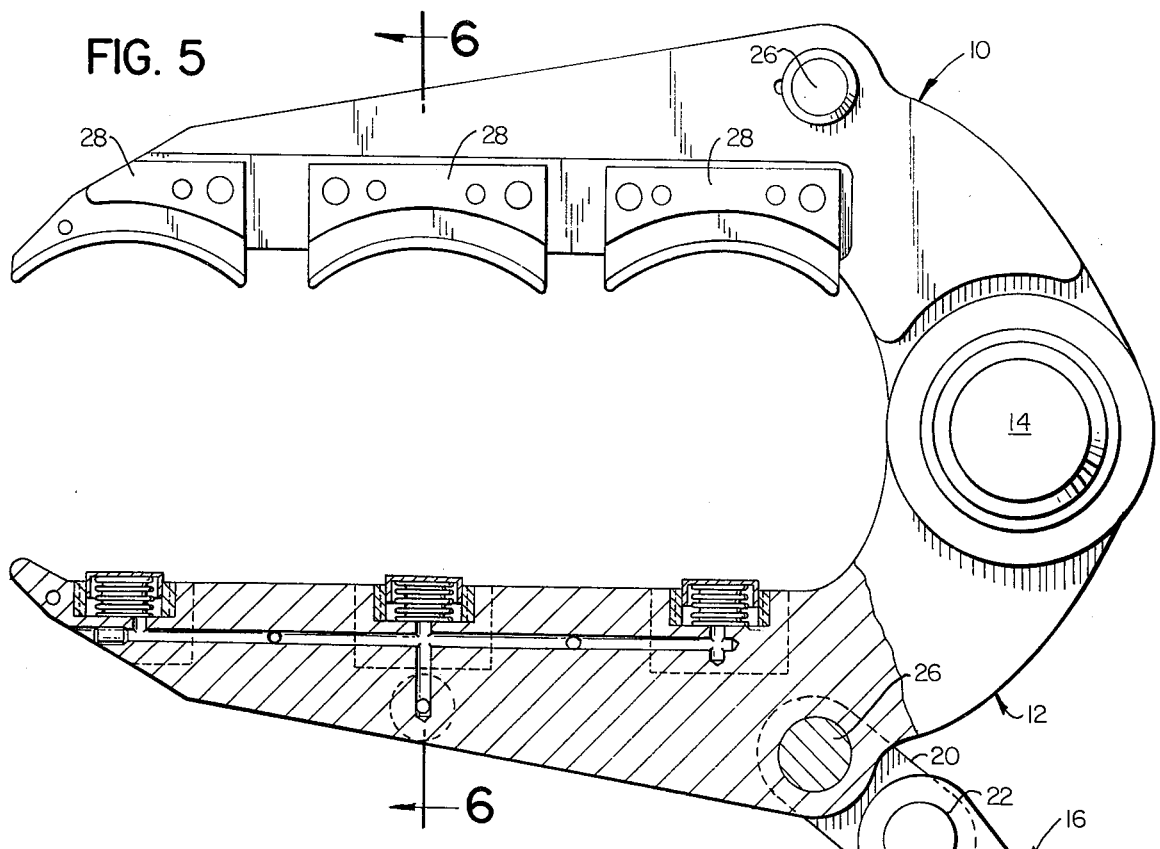
FIG. 5 is a view like FIG. 1, but in a construction wherein only one of the arms in the pair has the fluid pressure responsive means.
Figure 6:
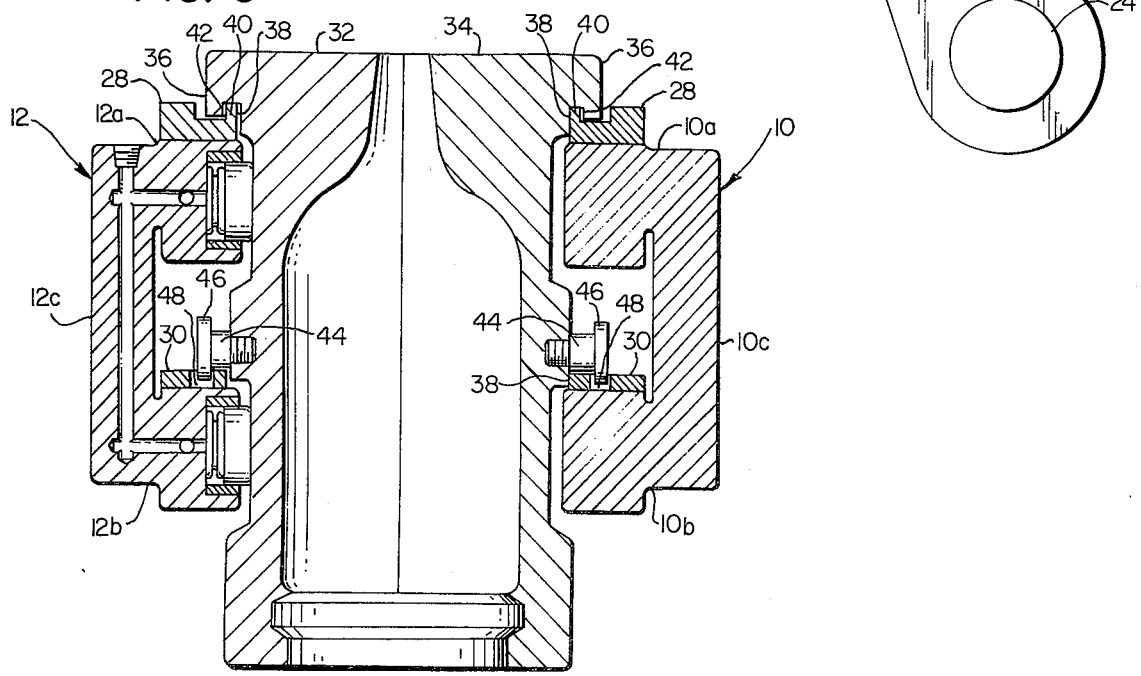
FIG. 6 is a view like FIG. 3 taken as indicated by the line 6—6 of FIG. 5.

In FIGS. 1–4 the fluid pressure responsive means, whether it involves a bellows or piston has been shown as applied to both arms 10 and 12 of the operating pair. The embodiment of the same invention shown in FIGS. 5 and 6 involves the use of the same type or types of fluid pressure responsive means in only one arm of the pair. That is, in FIGS. 5 and 6 the fluid pressure responsive means is shown, by example, as provided only in the arm 12, the arm 10 having no such means. However, as illustrated, the arm 10 continues to support its mold holder half or halves 34 for relative movement. Then, when the complementary halves 32 and 34 are forcefully engaged by the mechanical arm-closing linkage, the fluid pressure responsive means in arm 12 causes the mold half or halves 32 to act in the way previously described, with equal application of force from said fluid pressure responsive means. The half or halves 34 carried on the arm 10 are forced by the pressure responsive means so that the wall 38 on the half 34 engages the rim 40 on the upper portion 10a and also engages the bracket 30 on the lower portion 10b of the arm 10 and the head 46 on the screw 44 engages the far side of the notch 48, as shown in FIG. 6. The result of equal distribution of force on the mold halves is still beneficially obtained.

An advantage to the aforegoing construction in either embodiment resides in the ability to provide equal closing forces on all parts of mold halves of different sizes and shapes. Further, the closing force can be adjusted to take greatest mechanical advantage of the arm closing linkage 16 associated with each arm. That is, the hydraulic pressure utilized can be fixed to provide closing engagement when the angle ($a$) (FIG. 1) is such as to provide the greatest mechanical advantage in the operation of the respective linkage mechanisms 16, 16.

It will be understood from the foregoing description that the method of applying equal closing pressure on a plurality of glassware forming machine molds in accordance with this invention involves mechanical closing of the molds and hydraulic or fluid pressure control of the force keeping the complementary mold halves closed thereafter. That is, the mold holder arms are mechanically moved toward each other to effect forceful engagement of the complementary mold halves and each mold half which is movable horizontally relative to its supporting arm is subjected to hydraulic pressure which will limit its movement relative to its support arm whereby to control the force retaining it in engagement with its complementary mold half. In the embodiment of the invention wherein both arms have fluid pressure responsive means hydraulic force is applied to all mold halves, the pressure being preferably equal in each mold holder arm.

I claim:

1. A pair of arms pivotally supported at one end on a common axis, mechanism for operating said arms in forceful closing and opening movement toward and away from each other, each of the said arms having support means for a plurality of glassware mold halves spaced apart along the arm for engagement with complementary mold halves on the other arm in the forceful closing of the arms, the support means on at least one of the arms being such as to permit movement of each associated mold half relative to such one arm resulting from its engagement with its complementary mold half, at least one fluid pressure responsive means movably supported by the said at least one arm in engagement with each mold half supported on the said at least one arm, and the said at least one arm having a closed passage connecting all of its said pressure responsive means, inlet means connected to said passage for substantially filling it with fluid which is subjected to pressure by the said movement of the mold halves relative to the said at least one arm, the thus pressurized fluid applying equal pressure to all of the pressure responsive means in retaining the mold halves on said at least one arm in engagement with the complementary mold halves on the other arm.

2. The construction of claim 1 wherein the inlet means is adapted to permit filling the said passage with fluid at a selected pressure while said arms are forcefully closed and thereby to select the force applied by said pressure responsive means to retain the complementary mold halves in engagement.

3. The construction of claim 2 wherein each of said arms comprise upper and lower horizontal sections connected by a vertical strut and said at least one arm has a plurality of said pressure responsive means in each horizontal section and the pressure responsive means in both sections are connected by said passage, whereby each mold half supported by said at least one arm is engaged in its upper and lower areas by pressure responsive means, both of which apply the same pressure to hold the mold half in engagement with its complementary mold half.

4. The mold holder construction of claim 3 wherein both of said arms are constructed and arranged as set forth for said at least one arm.

5. The construction defined in claim 4 wherein each pressure responsive means comprises a bellows.

6. The construction defined in claim 4 wherein each pressure responsive means comprises a piston movable in a chamber defined in its associated arm, the piston being engageable with a mold half and the chamber being connected with the passage in its associated arm.

7. A method of applying equal closing pressure on a plurality of glassware forming machine molds each of which comprises complementary halves, there being a plurality of such halves supported along each of a pair of arms pivotally connected at one end on a common axis and the halves on at least one arm being supported for movement relative to the said one arm while being engaged by pressure responsive means movably supported by said one arm, the said method comprising the steps of mechanically moving said arms toward each other to effect forceful engagement of the complementary mold halves and subjecting each pressure responsive means supported on said at least one arm to the same fluid pressure to limit movement of the mold halves relative to the said at least one arm and thereby to control the complementary mold halves in engagement.

8. A method of applying equal closing pressure on a plurality of glassware forming machine molds each of which comprises complementary halves, there being a plurality of such halves supported along each of a pair of horizontal arms pivotally connected at one end on a common vertical axis and the halves being supported for horizontal movement relative to their respective arms while being engaged by pressure responsive means movably supported by the respective arms, the said method comprising the steps of mechanically moving said arms toward each other to effect forceful engagement of the complementary mold halves and subjecting all of the pressure responsive means to the same fluid pressure to limit movement of the halves relative to their respective arms and thereby to control the force retaining the complementary mold halves in engagement.

* * * * *